Dec. 17, 1957 R. B. LOIBL, JR 2,816,394
APPARATUS FOR PRODUCING INSECTICIDAL VAPOR
Filed Aug. 13, 1956
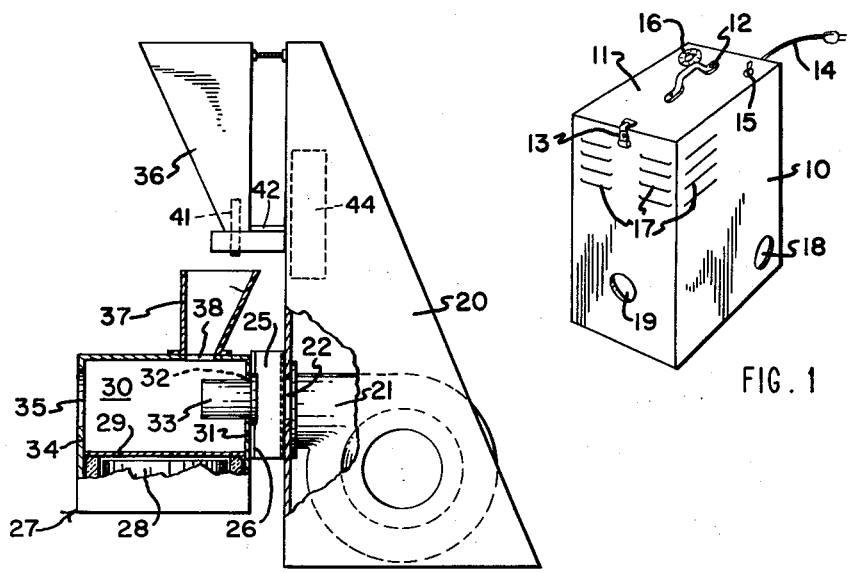
FIG. 1
FIG. 2
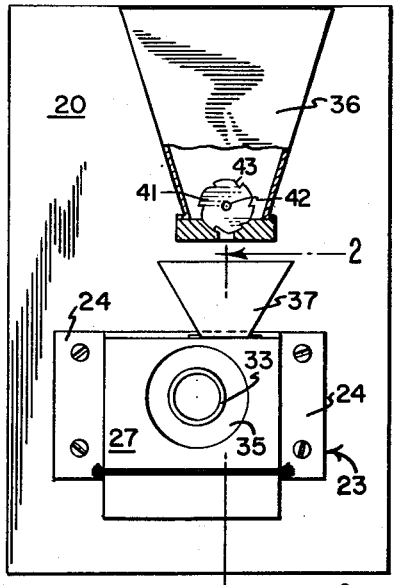
FIG. 3
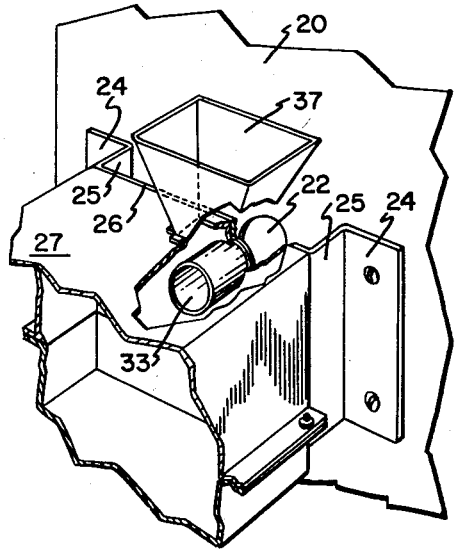
FIG. 4
ROBERT B. LOIBL, Jr.
*INVENTOR.*
BY Robert C. Comstock
HIS ATTORNEY

# United States Patent Office 2,816,394
Patented Dec. 17, 1957

2,816,394

APPARATUS FOR PRODUCING INSECTICIDAL VAPOR

Robert B. Loibl, Jr., Los Angeles, Calif.

Application August 13, 1956, Serial No. 603,667

7 Claims. (Cl. 43—129)

This application relates to an apparatus for producing vapor having insecticidal properties and projecting a dense concentration of the vapor into any enclosed space to be treated to rapidly exterminate insect life.

This application is a continuation in part and improvement upon the invention shown and described in my United States Patent No. 2,758,412, issued August 14, 1956.

The device of my invention is particularly designed for use with the chemical lindane, but, without change or with immaterial modification, may utilize other insecticidal materials having properties similar to lindane, which in the form utilized is a granular free flowing material resembling granulated sugar.

As generally practiced, fumigation of dwellings to eradicate insect pests involves the spraying of walls, floors, furniture and the like of the rooms with an insecticidal spray, or treatment of the sealed rooms with fumes poisonous to insects as well as to human beings. Such treatment is a lengthy process and it is an object of my apparatus to enable such operations to be carried out speedily, safely, and without danger of damage to finished surfaces, hangings or furniture coverings.

A further object is to provide a small and readily carried apparatus which is self contained and very simply operated, requiring only to be furnished with a supply of lindane, or any suitable chemical having similar characteristics, set for a period of operation determined by the circumstances, and plugged into an electric outlet of the usual house circuit.

Another object of the invention is to provide a thermal chamber in the device of my invention having a hot plate therein onto which the lindane is dropped by electrically operated or other suitable feeding means, the hot plate being automatically maintained at a temperature such that the insecticidal material is instantly vaporized.

A further object is to provide means projecting the vapor from the device by means producing a current of air through the thermal chamber.

A still further object of the invention is to arrange the apparatus of my invention upon a single supporting structure enclosed in a case, a single control means for the device being mounted on the exterior of the case. In the event that repair or adjustment of any of the mechanisms of the apparatus is needed, the supporting structure may be readily removed from the case, enabling access to be had to all of said mechanisms.

The foregoing are all objects which this invention shares in common with the above mentioned co-pending application. It is a particular object of the present invention to improve upon the structure shown in said application by providing an improved thermal chamber for vaporization of the insecticidal material.

In a device of the class described, there must be a supply of fresh air entering the chamber simultaneously with the entry of the insecticidal material, there must be cooperation rather than interferences between these supplies, there must be sufficient and constant turbulence within the thermal chamber to mix the insecticidal vapor with the air and there must be a constant flow of this mixture from the chamber.

It is an object of my invention to provide an apparatus of the class described and particularly a thermal vaporizing chamber structure therefor which achieves all of these results.

It is a further object of my invention to provide an apparatus of the class described in which the thermal chamber is substantially completely insulated from the remainder of the apparatus without interfering with the accomplishment of the above described results.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a perspective view of my complete portable apparatus for producing and utilizing insecticidal vapor;

Fig. 2 is a side elevational view of the feeding hopper, thermal chamber and blower assembly removed from the case, with portions broken away and shown in section, the section being taken substantially along lines 2—2 of Fig. 3;

Fig. 3 is a front elevational view of the structure shown in Fig. 2;

Fig. 4 is a top perspective view of the thermal chamber assembly, with portions broken away to show the interior structure.

A preferred embodiment which has been selected to illustrate my invention comprises a carrying case 10 in which the operating mechanism of my apparatus is removably mounted. The case 10 is provided on the top thereof with a cover 11 having a handle 12. A latch 13 secures the cover 11 to the case 10. Electrical power for operation of the apparatus is provided through an electrical cord 14 which is adapted to be connected to a suitable source of electrical supply. A switch 15 controls the operation of the apparatus in combination with a timing control 16.

The details of the electrical circuits, timing mechanism and feeding mechanism which may be used are fully disclosed in my United States Patent No. 2,758,412. Such details are accordingly omitted here, since the structure of the present invention may be used in combination with such structure or with any other suitable means.

The upper portion of the case 10 is provided with a plurality of louvers 17, a circular air inlet opening 18 and a circular outlet opening 19.

The structure with which the present invention is concerned is attached to a mounting base 20, which is securely but removably mounted within the case 10. The base 20 is slightly smaller in height and width than the case 10, so as to fit within the interior thereof. The sides of the base 20 are substantially triangular as shown in Fig. 2 of the drawings. Mounted within the lower portion of the base 20 is an electrically operated blower 21, which is adapted to direct a stream of air through a circular opening 22 in the front of the base 20.

A mounting bracket 23 has a pair of oppositely disposed end portions 24 which are secured to the front of the base 20 by suitable fastening means. The bracket 23 is provided with right angular portions 25 adjacent its end portions 24 so that its center 26 is spaced forwardly from the base 20.

A thermal chamber 27 is suitably mounted on the center 26 of the mounting bracket 23. The thermal chamber 27 has a heating element 28 mounted within the lower portion thereof which is adapted to heat the floor 29 of the vaporizing area 30 to a temperature sufficiently high to vaporize insecticidal material which is placed thereon.

The outside of the chamber 27 is preferably completely covered with suitable insulating material such as Fiberglas or the like. This insulating material serves two purposes. First, it prevents heat from escaping into other portions of the apparatus. Second, it maintains the walls of the vaporizing area at a sufficiently high temperature to prevent any condensation of the insecticidal vapor thereon.

The rear wall 31 of the thermal chamber 27 is provided with a circular opening 32 which is substantially aligned with the circular opening 22 through which air is supplied from the blower 21. It will be noted, however, that the openings 32 and 22 are separated from each other by a distance equal to that of the right angular portions 25 of the mounting bracket 23.

An elongated tubular member 33 is mounted within the opening 32 in such a manner that it extends forwardly therefrom a substantial distance into the vaporizing area 30 of the thermal chamber 27.

The front wall 34 of the thermal chamber 27 is provided with a circular outlet opening 35, the center of which is aligned with the center of openings 32 and 22. When my apparatus is assembled, the outlet opening 35 is disposed directly behind and in alignment with the outlet opening 19 in the case 10. It will be noted that the openings 32 and 35 are spaced upwardly from the floor 29 of the vaporizing area 30.

A hopper 36 is attached to the upper end of the case 10 directly above the thermal chamber 27. The hopper 36 is adapted to hold insecticidal material, which may be solid or liquid, and supply the same to the vaporizing area 30 of the thermal chamber 27 through suitable feeding means.

The feeding means in the embodiment shown comprises a wheel 41, which is mounted adjacent an opening in the bottom of the hopper 36. The wheel 41 is rotatably mounted on a shaft 42 and has a plurality of notches 43 spaced around its periphery. The wheel 41 may be rotated by means of an electric motor 44. As the wheel 41 rotates, the notches 43 pick up the insecticidal material and drop it from the hopper 36 downwardly into the top of a funnel 37 which is mounted on the top of the thermal chamber 27 directly beneath the bottom of the hopper 36. The top of the thermal chamber 27 has an opening 38 through which the insecticidal material flows by gravity from the funnel 37 into the vaporizing area 30.

It should be noted that the forward end of the tubular member 33 through which air is supplied to the vaporizing area 30 by the blower 21 extends beyond the rear edge of the funnel 37. The insecticidal material flows down the angular rear wall 40 of the funnel 37 so that it does not pass directly into the stream of air flowing from the tubular member 33.

Referring to Fig. 3 of the drawings, it will also be noted that the tubular member 33 is offset to one side from the funnel 37, so that the insecticidal material enters the chamber to one side of the air stream. The insecticidal material is thus certain to fall directly to the floor 29 of the vaporizing area 30 to be vaporized before it is mixed with the air.

It has been found that the structure shown and described achieves all of the desired results set forth in the objects of the present application. The tubular member 33 acts to carry the stream of air into the vaporizing area 30 in such a manner that it does not interfere with the flow of insecticidal material from the hopper 36.

A sufficient amount of air leaving the forward end of the tubular member 33 strikes the forward and side walls of the vaporizing area 30 to cause a constant condition of turbulence to be created and maintained within the vaporizing area 30. It has been found that this turbulence is best achieved and maintained if the centers of the openings 22, 32 and 35 are all aligned.

With the construction disclosed, a condition of continuous suction is created and maintained adjacent and beneath the opening 38 so that the insecticidal material is drawn into the vaporizing area 30 instead of being blown therefrom. This suction is created by the rapid movement of air from the forward end of the tubular member 33, which causes a certain amount of air to be drawn downwardly through the funnel 37 into the vaporizing area 30. The flow of air into the chamber thus acts to assist the flow of insecticidal material instead of opposing or interfering with it.

It will be noted that an air gap is provided between the thermal chamber 27 and the base 20. This gap limits the conduction of heat to the base 20 and acts to insulate and isolate the thermal chamber 27 from the remainder of the apparatus. Deleterious effects of the heat upon other portions of the apparatus are thus avoided.

The use of my apparatus is believed to be apparent from the foregoing description.

In use, electrical current is supplied to operate the blower 21, heating element 38, motor 44 and timing mechanisms if the same are used. Fresh air is supplied to the blower 21 through the air inlet opening 18. This air is passed through the opening 22 by the blower 21. The air enters the vaporizing area 30 through the tubular member 33 simultaneously with the flow of insecticidal material thereinto from the hopper 36 and funnel 37 through opening 38.

The heating element 28 is supplied with electrical current sufficient to maintain the floor 29 at a temperature which will vaporize the insecticidal material as it falls upon the floor 29. The relationship of the air and insecticidal material flow is such that complete vaporization of the insecticidal material is assured, together with a complete mixture of the vapor with the air before it is driven from the vaporizing area 30 through the openings 35 and 19 into the area being treated.

While the openings used are shown and described as being circular and the tubular member is shown and described as circular in cross section, it will be seen that other shapes and cross sections may be used with equal effectiveness.

The insecticidal material used with my device may be in a liquid form rather than granular, with the insecticidal feeding mechanism being modified accordingly.

I claim:

1. In an apparatus of the kind described, a thermal chamber having top, bottom and side walls, said bottom wall comprising a heat radiating plate affording an upwardly directed heat radiating surface within said chamber, said chamber having a pair of oppositely disposed aligned circular inlet and outlet openings extending through the side walls thereof, the lower edges of said inlet and outlet openings being upwardly spaced in relation to said heat radiating surface, an elongated cylindrical air directing member mounted within said chamber adjacent to said inlet opening, said elongated member extending a substantial distance into said chamber toward said outlet opening, and air injection means operatively connected with said inlet opening to direct a current of air into said chamber through said air directing member circumjacent to said surface, the top wall of said chamber having a feed opening for delivering insecticidal material upon said heat radiating surface, the inner end of said elongated member being disposed forwardly from the rear edge of said feed opening and being offset laterally with respect to said feed opening, so that insecticidal material entering said chamber through said feed opening will not enter the stream of air leaving the inner end of said elongated member, said stream of air being adapted to create a condition of continuous suction beneath said feed opening, whereby insecticidal material is drawn downwardly through said feed opening into said chamber, the inner end of said elongated member being spaced a sufficient distance from the walls of said chamber so that a portion of the stream of air passing therefrom strikes the walls of said chamber to create and maintain a condition of constant turbulence within said chamber, whereby said air is mixed with the insecticidal material as it is vaporized on said heat radiating surface and said mixture is directed out through said outlet opening.

2. In an apparatus of the kind described, a thermal chamber having top, bottom and side walls, said bottom wall comprising a heat radiating plate affording an upwardly directed heat radiating surface within said chamber, said chamber having a pair of oppositely disposed aligned inlet and outlet openings extending through the side walls thereof, the lower edges of said inlet and outlet openings being upwardly spaced in relation to said heat radiating surface, an air directing member mounted within said chamber adjacent to said inlet opening, said member extending into said chamber toward said outlet opening, and air injection means operatively connected with said inlet opening to direct a current of air into said chamber through said air directing member circumjacent to said heat radiating surface, the top wall of said chamber having a feed opening for delivering insecticidal material upon said heat radiating surface, the inner end of said air directing member being disposed forwardly from the rear edge of said feed opening so that insecticidal material entering said chamber through said feed opening will not enter the stream of air leaving the inner end of said air directing member, said stream of air being adapted to create a condition of continuous suction beneath said feed opening whereby insecticidal material is drawn downwardly through said feed opening into said chamber, the inner end of said member being disposed so that a portion of the stream of air passing therefrom strikes the walls of said chamber to create and maintain a condition of constant turbulence within said chamber, whereby said air is mixed with the insecticidal material as it is vaporized on said heat radiating surface, and said mixture is directed out through said outlet opening.

3. In an apparatus of the kind described, a thermal chamber having top, bottom and side walls, said bottom wall comprising a heat radiating plate affording an upwardly directed heat radiating surface within said chamber, said chamber having a pair of oppositely disposed inlet and outlet openings extending through the side walls thereof, said inlet opening being substantially aligned with said outlet openings, the lower edges of said inlet and outlet openings being upwardly spaced in relation to said heat radiating surface, an air directing member mounted within said chamber adjacent to said inlet opening, said member extending into said chamber, and air injection means operatively connected with said inlet opening to direct a current of air into said chamber through said air directing member circumjacent to said surface, the top wall of said chamber having an opening for delivering insecticidal material upon said heat radiating surface, the inner end of said air directing member being offset with respect to said feed opening, so that insecticidal material entering said chamber through said feed opening will not enter the stream of air leaving the inner end of said member, the inner end of said air directing member being disposed so that a portion of the stream of air passing therefrom strikes the walls of the chamber to create and maintain a condition of constant turbulence within said chamber, whereby said air is mixed with the insecticidal material as it is vaporized on said heat radiating surface and said mixture is directed out through said outlet opening.

4. In an apparatus of the kind described, a thermal chamber having top, bottom and side walls, said bottom wall comprising a heat radiating plate affording an upwardly directed heat radiating surface within said chamber, said chamber having a pair of oppositely disposed aligned inlet and outlet openings extending through the side walls thereof, the lower edges of said inlet and outlet openings being upwardly spaced in relation to said heat radiating surface, and an air directing member, adapted to receive and direct a stream of air, mounted within said chamber adjacent to said inlet opening, said member extending into said chamber toward an outlet opening, the inner end of said member being disposed so that a portion of the stream of air passing therefrom strikes the walls of said chamber to create and maintain a condition of constant turbulence within said chamber, whereby said air is mixed with the insecticidal material as it is vaporized on said heat radiating surface and said mixture is directed upward through said outlet opening.

5. In an apparatus of the kind described, a thermal chamber having closed walls, a heat radiating plate affording an upwardly directed heat radiating surface within said chamber, said chamber having an inlet opening and an outlet opening, the lower edges of said inlet opening and outlet opening being upwardly spaced in relation to said heat radiating surface, said inlet opening being substantially aligned with said outlet opening, an air directing member extending into said chamber, and air injection means operatively connected with said inlet opening to direct a current of air into said chamber through said air directing member circumjacent to said surface, the inner end of said air directing member being disposed so that a portion of the stream of air passing therefrom strikes the walls of said chamber to create and maintain a condition of constant turbulence within said chamber, whereby said air is mixed with the insecticidal material as it is vaporized on said heat radiating surface and said mixture is directed out through said outward opening.

6. The structure described in claim 5, said air directing member being aligned with said inlet and outlet openings and extending directly from said inlet opening toward said outlet opening.

7. In an apparatus of the kind described, a thermal chamber having closed walls, a heat radiating plate affording an upwardly directed heat radiating surface within said chamber, said chamber having an inlet opening and an outlet opening, the lower edges of said inlet opening and outlet opening being upwardly spaced in relation to said heat radiating surface, an air directing member extending into said chamber, and air injection means operatively connected with said inlet opening to direct a current of air into said chamber through said air directing member circumjacent to said surface, the inner end of said air directing member being disposed so that a portion of the stream of air passing therefrom strikes the walls of said chamber to create and maintain a condition of constant turbulence within said chamber, whereby said air is mixed with the insecticidal material as it is vaporized on said heat radiating surface and said mixture is directed out through said outward opening, said thermal chamber being attached to a base member, there being a substantial air space between said thermal member and said base member to limit the transmission of heat from said thermal chamber to said base member.

References Cited in the file of this patent

UNITED STATES PATENTS

| 2,662,332 | McIntire | Dec. 15, 1953 |
| 2,758,412 | Loibl | Apr. 14, 1956 |